(12) United States Patent
Atkinson

(10) Patent No.: US 7,785,409 B2
(45) Date of Patent: Aug. 31, 2010

(54) FIRE-RESISTANT GROUND COVER AND FIRE-RESISTANT COATINGS FOR BIOMASS, WOOD AND ORGANIC MULCHES

(75) Inventor: Dana Atkinson, Carson City, NV (US)

(73) Assignee: Prisum Coatings Canada, Inc., Bolton (CA)

( * ) Notice: Subject to any disclaimer, the term of this patent is extended or adjusted under 35 U.S.C. 154(b) by 536 days.

(21) Appl. No.: 11/564,822

(22) Filed: Nov. 29, 2006

(65) Prior Publication Data
US 2007/0119334 A1 May 31, 2007

Related U.S. Application Data

(60) Provisional application No. 60/740,338, filed on Nov. 29, 2005.

(51) Int. Cl.
*C09K 21/02* (2006.01)
(52) U.S. Cl. ............... 106/18.23; 106/15.05; 106/18.11; 106/18.16; 106/164.5; 252/607; 428/537.1; 428/921
(58) Field of Classification Search ............. 106/15.05, 106/18.11, 18.16, 18.23, 164.5; 252/607; 428/537.1, 921
See application file for complete search history.

(56) References Cited

U.S. PATENT DOCUMENTS

| 3,027,326 | A | * | 3/1962 | Moffett | ............... 252/62 |
| 5,582,759 | A | | 12/1996 | Bursey, Jr. et al. | |
| 5,948,148 | A | * | 9/1999 | Cuevas | ............ 106/18.13 |
| 6,406,755 | B1 | | 6/2002 | Kindt et al. | |
| 6,461,542 | B1 | * | 10/2002 | Smith et al. | ........... 252/601 |

FOREIGN PATENT DOCUMENTS

| DE | 1215357 B | * | 4/1966 |
| GB | 2165270 A | * | 4/1986 |
| JP | 07-285107 A | * | 10/1985 |
| JP | 08-089097 A | * | 4/1996 |
| WO | WO2004/050985 A1 | * | 6/2004 |

OTHER PUBLICATIONS

Derwent Patent Abstract No. 1983-41000K, abstract of Soviet Union Patent Specification No. 936934B (Jun. 1982).*

* cited by examiner

*Primary Examiner*—Anthony J Green
(74) *Attorney, Agent, or Firm*—George R. McGuire; Frederick J. M. Price; Bond Schoeneck & King, PLLC

(57) ABSTRACT

The present invention discloses a fire-resistant ground cover and a composition and method for treating cellulosic material such as biomass, wood and organic mulch to increase its resistance to flame to provide a fire-resistant ground cover material.

7 Claims, 1 Drawing Sheet

FIRE-RESISTANT GROUND COVER AND FIRE-RESISTANT COATINGS FOR BIOMASS, WOOD AND ORGANIC MULCHES

This application claims priority to U.S. Provisional Patent Application No. 60/740,338, filed Nov. 29, 2005.

FIELD OF THE INVENTION

The present invention relates to a fire-resistant ground cover and a composition that can be applied to biomass, wood and organic mulches to enhance the ability of such materials to resist flame and to provide a fire-resistant and aesthetically pleasing ground cover material.

BACKGROUND OF THE INVENTION

Cellulosic materials such as wood chips or bark mulch are commonly used as decorative mulches and ground covers to retain beneficial moisture and control weeds in planting beds. Such materials are aesthetically pleasing, are easily applied and maintained, and are inexpensive to produce. When dry, however, such materials are a fuel source for fire. As such, they can be a dangerous source of fire around buildings (and within buildings that contain interior planting beds).

Most cellulosic materials such as wood fiber and biomass have a natural tendency to resist flame or heat. They initially burn to a point that char (a carbon layer) is created on their outer surfaces. This process of partial combustion and development of a layer of carbon affords some level of resistance to flame and heat. A variety of methods and compositions have been developed to enhance the ability of certain materials to resist flame and heat.

For example, there have been attempts to increase the fire resistance of cellulosic material for use as decorative mulch and ground cover. U.S. Pat. No. 6,461,542 to Smith, et al, discloses a combination of cellulosic debris and asphalt-containing material. Such a combination, however, is more difficult to color than untreated cellulosic material and thus is not preferred as a decorative mulch. In addition, the asphalt component of the mixture will decompose more slowly than the cellulosic component, eventually leaving a ground cover composed only of asphalt-containing material.

Other fire-resistant compositions for cellulosic material, such as that disclosed in U.S. Pat. No. 6,652,633 to Pasek, et al., involve complicated preparation processes and overly complicated application processes to produce fire-resistant cellulosic material.

There remains a need for a simple, easy to apply resistant composition that can be applied to biomass, wood, and organic mulches to enhance such materials' ability to resist flame.

It is therefore an object of the present invention to provide a simple, easy to apply composition for biomass, wood and organic mulches, which increases their resistance to flame. It is also an object of the present invention to provide a simple easy to apply composition that treats such materials to increase their resistance to flame and provides a desirable decorative coloring. It is a further object of the present invention to provide a decorative mulch for landscape use that has fire-resistant properties and provides an aesthetically desirable coloring effect.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
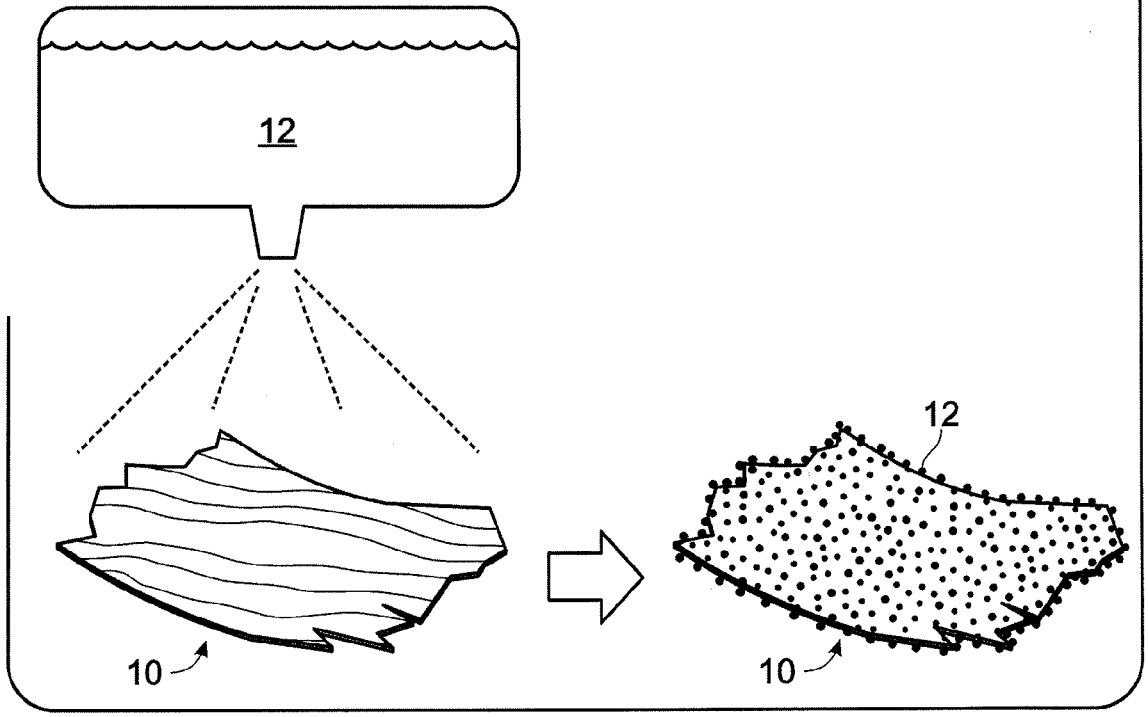
FIG. 1 is a side elevation view of a cellulosic particle treated according to the present invention.
Figure 2:
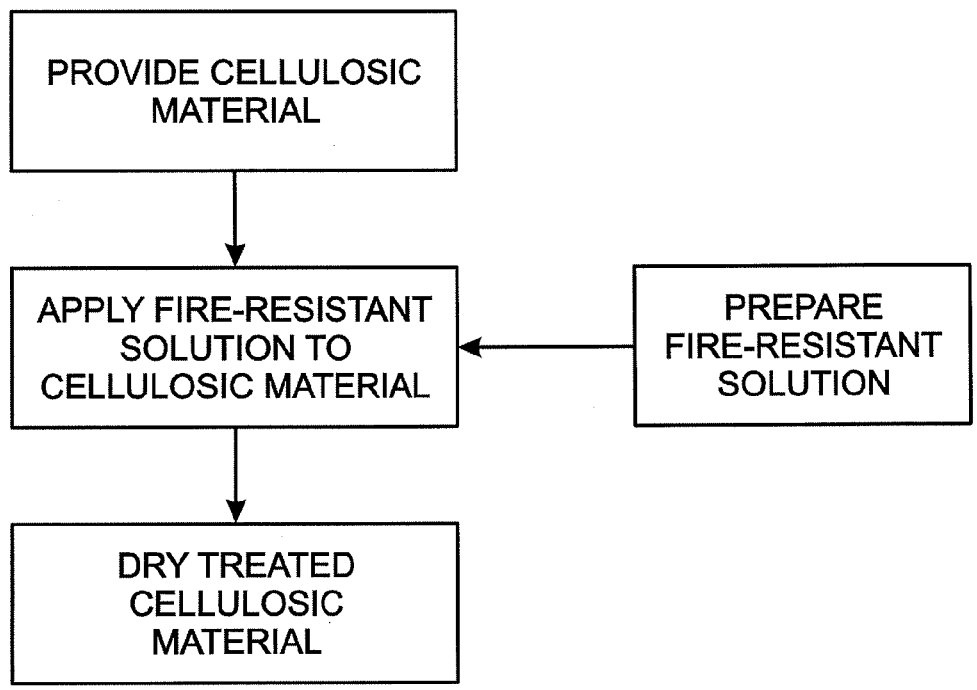
FIG. 2 is a flowchart showing the steps of treating cellulosic material according to the present invention.

Referring now to the drawings, wherein like reference numerals refer to like parts throughout, there is seen in FIG. 1 a particle of cellulosic material 10. Particle 10 can be a chip of bark or wood, a particle of saw dust or other similar material. According to the present invention, particle 10 is treated with fire-resistant composition 12. Fire-resistant composition 12 comprises either ammonium sulfate or monoammonium phosphate in combination with water. According to an embodiment of the present invention, the cellulosic material can contain approximately up to 1% by volume of a fire-resistant compound selected from the group consisting of ammonium sulphate and monoammonium phoshate.

Preferably, fire-resistant composition 12 includes a surfactant to reduce the surface tension of the water based composition, which increases the ability of particle 10 to absorb fire-resistant composition 12.

Preferably, fire-resistant composition 12 also includes a colorant. Addition of a colorant provides a number of benefits. First, it allows one to determine visually if a quantity of cellulosic material 10 has been treated with fire-resistant composition 12. Second, it provides an aesthetically pleasing color to treated material, which is desirable when the cellulosic material 10 is used as decorative mulch. When the desired color of cellulosic material 10 is its natural color, a resinous sealer such as water-based acrylic is added to fire-resistant composition 12 to prevent color change in response to sunlight and ultraviolet exposure.

According to the present invention, fire-resistant composition 12 is formulated by dissolving ammonium sulfate or monoammonium phosphate in water to form a solution of 6%. According to the preferred embodiment, a surfactant such as dish soap is added to the solution. The preferred concentration of surfactant is 3%. According to an embodiment of the present invention, a colorant such as an organic or inorganic pigment based dye is added to the solution. According to the preferred embodiment, a colorant such as an iron oxide based dye is also added to the solution. Alternatively, a colorless resin stabilizer such as water-based acrylic can be added to the solution to preserve the natural color of cellulosic particles 10 and prevent them from changing color in response to sunlight and ultraviolet exposure.

After fire-resistant composition 12 has been prepared, it is applied to particles 10. Typically, cellulosic material consisting of decorative wood mulch includes particles having sizes that can range from sawdust (less than ¼ inch across) to large chips that may be as much as 6-8 inches across. According to the preferred embodiment, fire-resistant composition 12 is applied by spraying it on particles 10, using techniques known in the art for applying colorant to cellulosic material. For example, fire-resistant composition 12 can be sprayed on untreated particles 10 while they are being transported through an auger or in a Trommel type rotating basket.

After the particles 10 have absorbed sufficient fire-resistant composition 12 (typically 1-15 minutes, depending on the concentration of surfactant and size of the particles 10), they can be removed from the tank or other vessel. In yet another alternative, fire-resistant composition 12 can be sprayed on cellulosic material as it is being processed to achieve its desired size, for example while wood or similar material is being processed in a chipper or hammer mill to produce particles 10. An advantage of this particular method of application is that the fire-resistant composition 12 also provides a measure of dust control during the size processing.

After the fire-resistant composition 12 has been applied to the cellulosic material, the cellulosic material is allowed to dry until it has a moisture content of less than approximately 40%, and preferably approximately 12%. For most purposes, a moisture content of 18%-20% is acceptable. Drying the cellulosic material to this level permits it to be stored in bags or similar containers without allowing a portion of the fire-resistant composition 12 to transfer to the storage containers. The fire resistant effect of composition 12 is not dependent on drying the particles 10; the drying step is performed solely for ease of transport and distribution of treated particles 10. In low humidity environments, drying of particles 10 can be accomplished without artificial assistance by allowing excess moisture to evaporate naturally from particles 10. Alternatively, a stream of air having low relative humidity can be directed over saturated particles 10 to expedite the evaporation of excess moisture from particles 10.

After particles 10 have dried, they can be used, for example, as a decorative landscape mulch. Even though the active elements of fire-resistant composition 12 are soluble in water, the active elements resist leaching out when exposed to levels of rain and other precipitation experienced in the generally arid environments that tend to have high risks of fire. The fire-resistant effect on particles 10 has been found to continue until the particles 10 decompose.

While there has been illustrated and described what is at present considered to be the preferred embodiment of the present invention, it should be understood and appreciated that modifications may be made by those skilled in the art and that the appended claims encompass all such modifications that fall within the full spirit and scope of the present invention.

What is claimed is:

1. A fire-resistant ground cover comprising a quantity of cellulosic material, said cellulosic material containing more than 0.007% and less than 0.5% by volume of a fire-resistant compound consisting of ammonium sulphate, wherein said cellulosic material is treated with a colorant wherein said colorant comprises an organic or inorganic pigment based dye.

2. The fire-resistant ground cover of claim 1, wherein the cellulosic material is comprised of particles of wood.

3. The fire resistant ground cover of claim 1, wherein the colorant is an iron oxide based dye.

4. A fire-resistant ground cover consisting essentially of a quantity of cellulosic material, said cellulosic material containing more than 0.007% and less than 0.5% by volume of a fire-resistant compound consisting of ammonium sulphate, wherein said cellulosic material is treated with a colorant wherein said colorant comprises an organic or inorganic pigment based dye.

5. The fire-resistant ground cover of claim 4, wherein the cellulosic material is comprised of particles of wood.

6. The fire resistant ground cover of claim 4, wherein the colorant is an iron oxide based dye.

7. A fire-resistant ground cover consisting of a quantity of cellulosic material, said cellulosic material containing more than 0.007% and less than 0.5% by volume of a fire-resistant compound consisting of ammonium sulphate, wherein said cellulosic material is treated with a colorant wherein said colorant comprises an organic or inorganic pigment based dye.

* * * * *